United States Patent
Nagai

(10) Patent No.: US 7,978,572 B2
(45) Date of Patent: Jul. 12, 2011

(54) DEVICE AND METHOD FOR REPRODUCING DIGITAL SIGNAL AND DEVICE AND METHOD FOR RECORDING DIGITAL SIGNAL

(75) Inventor: Yutaka Nagai, Yokohama (JP)

(73) Assignee: Renesas Electronics Corporation, Kawasaki-shi (JP)

( * ) Notice: Subject to any disclaimer, the term of this patent is extended or adjusted under 35 U.S.C. 154(b) by 232 days.

(21) Appl. No.: 12/466,219

(22) Filed: May 14, 2009

(65) Prior Publication Data
US 2009/0285061 A1    Nov. 19, 2009

(30) Foreign Application Priority Data

May 15, 2008 (JP) .................................. 2008-128198

(51) Int. Cl.
*G11B 5/09* (2006.01)
(52) U.S. Cl. ................. 369/47.3; 369/47.28; 369/53.34; 369/59.19
(58) Field of Classification Search ............... 369/47.28, 369/47.3, 53.34, 59.19
See application file for complete search history.

(56) References Cited

U.S. PATENT DOCUMENTS

| | | | |
|---|---|---|---|
| 5,602,812 A * | 2/1997 | Miura et al. ................. | 369/47.3 |
| 2001/0006495 A1 | 7/2001 | Hayashi et al. | |
| 2001/0006498 A1 | 7/2001 | Hayashi et al. | |
| 2005/0002306 A1 * | 1/2005 | Urita ........................... | 369/59.21 |
| 2006/0109761 A1 * | 5/2006 | Kano ........................... | 369/47.28 |

FOREIGN PATENT DOCUMENTS

| | | |
|---|---|---|
| JP | 10-040638 A | 2/1998 |
| JP | 10-320933 A | 4/1998 |
| JP | 10-261274 A | 9/1998 |
| JP | 11-134801 A | 5/1999 |
| JP | 11-232039 A | 8/1999 |
| JP | 2001-006298 A | 1/2001 |
| JP | 2001-250327 A | 9/2001 |
| JP | 2001-283538 A | 10/2001 |
| JP | 2003-091942 A | 3/2003 |

OTHER PUBLICATIONS

Pan, Jyh-Shin et al., "Fully Integrated CMOS SoC for 56/18/16 CD/DVD-dual/RAM Applications with On-Chip 4-LVDS Channel WSG and 1.5Gb/s SATA PHY," ISSC 2006 Digest of Technical Papers, pp. 266-267, 653.

* cited by examiner

*Primary Examiner* — Wayne R Young
*Assistant Examiner* — Brenda Bernardi
(74) *Attorney, Agent, or Firm* — Miles & Stockbridge P.C.

(57) ABSTRACT

A technique capable of realizing a power saving in a device for reproducing/recording digital signals by properly controlling a frequency of a clock. The device for reproducing/recording digital signals (device for reproducing an optical disk) includes: a difference comparing circuit for comparing a first parameter (demodulating block counter) updated each time a process for one correcting block is done in a demodulating circuit with a second parameter (error correcting block counter) updated each time a process of one correcting block is done in an error correcting circuit; and a circuit (clock controlling circuit etc.) for switching a frequency of a master clock (MCLK) depending on a comparison result of the difference comparing circuit. Thereby, the frequency of the clock can be switched both of when the demodulation for one correcting block is ended and when the correcting process for one correcting block is ended by using the switched master clock.

16 Claims, 12 Drawing Sheets

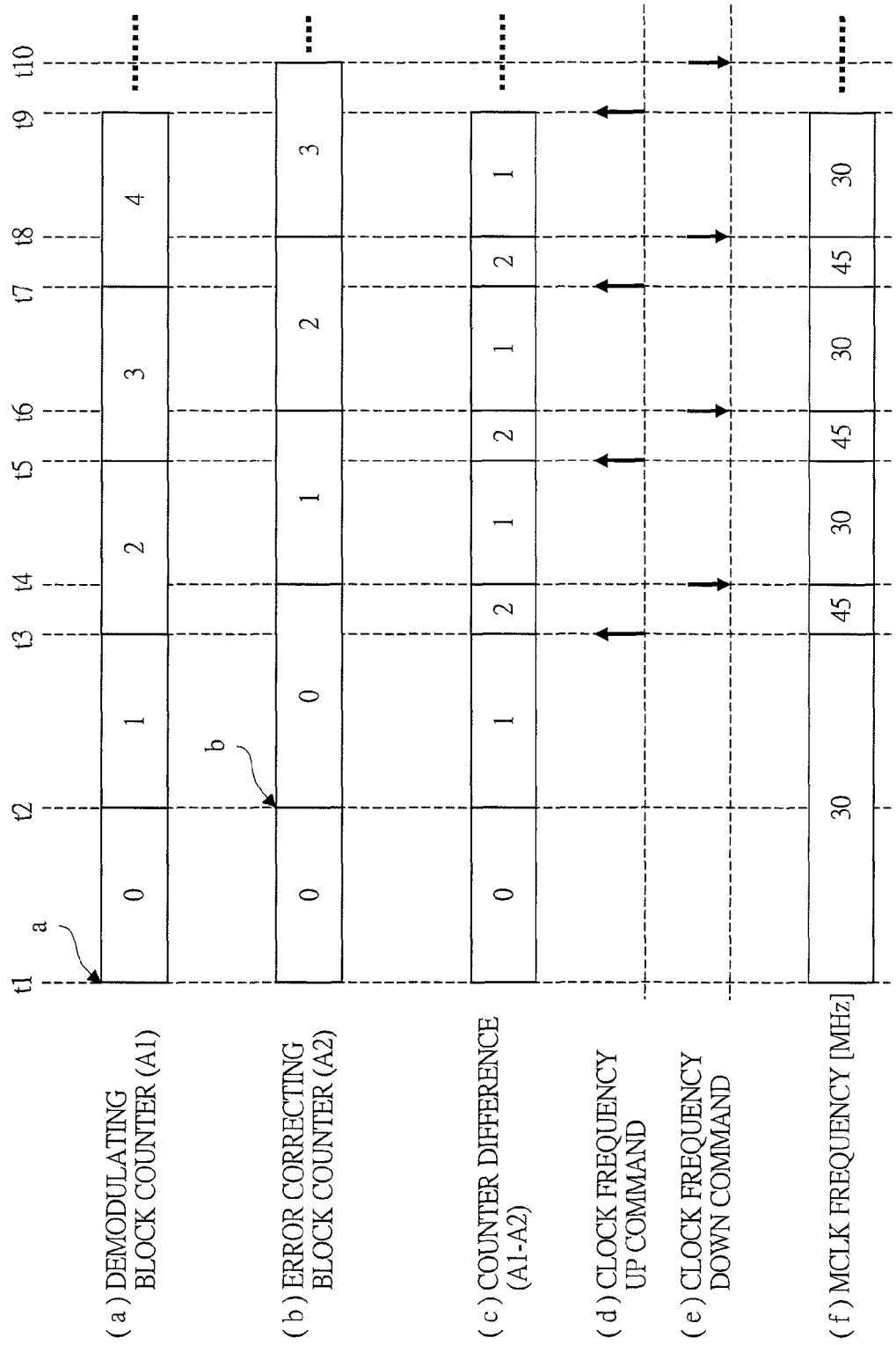

INNER PERIPHERY = LINEAR VELOCITY : LOW

OUTER PERIPHERY = LINEAR VELOCITY : HIGH

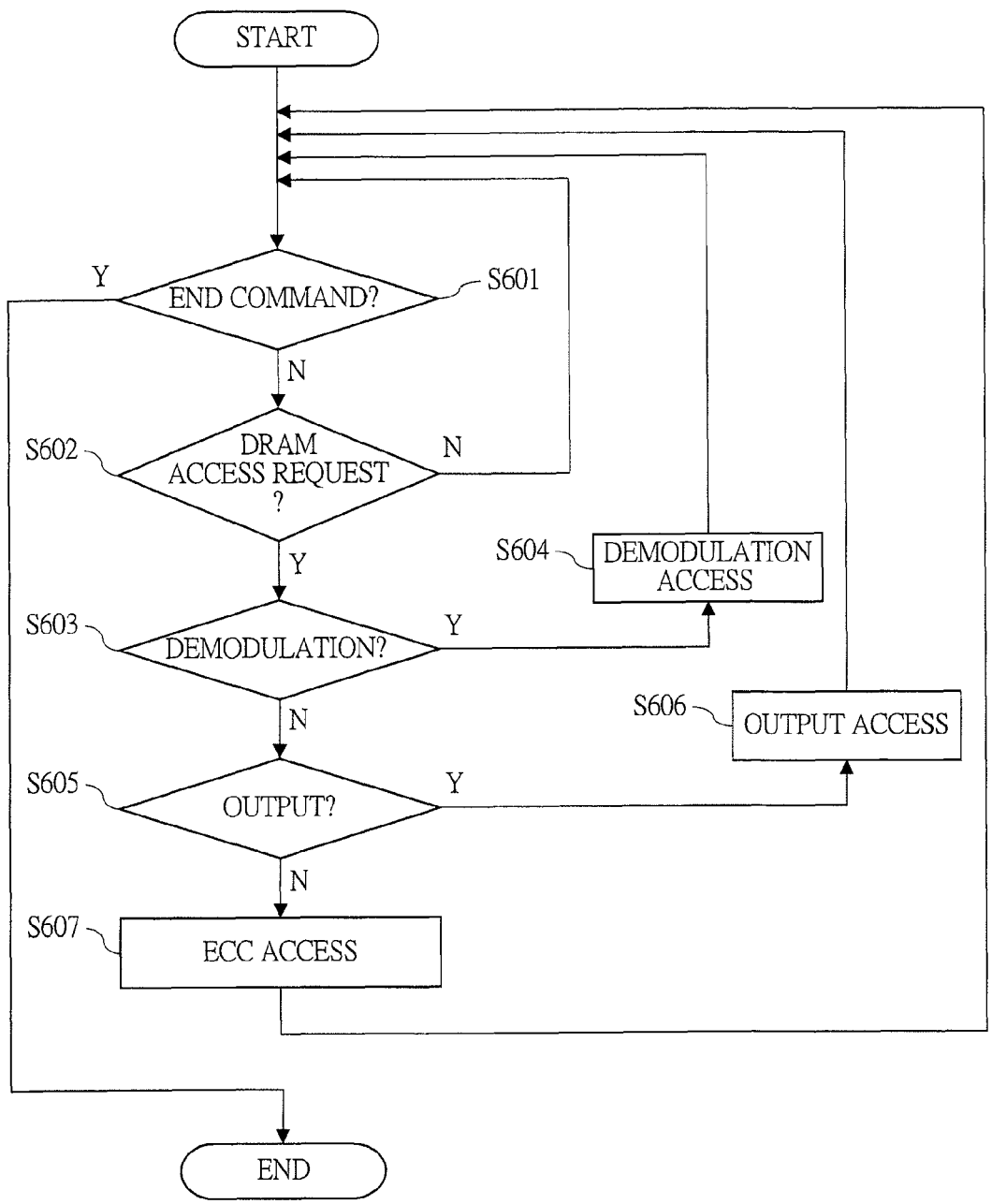

DEVICE AND METHOD FOR REPRODUCING DIGITAL SIGNAL AND DEVICE AND METHOD FOR RECORDING DIGITAL SIGNAL

CROSS-REFERENCE TO RELATED APPLICATION

The present application claims priority from Japanese Patent Application No. JP 2008-128198 filed on May 15, 2008, the content of which is hereby incorporated by reference into this application.

TECHNICAL FIELD

The present invention relates to a device and a method for recording and reproducing digital signals such as a disk medium. More particularly, the present invention relates to a power saving for a digital signal process of encode and decode.

BACKGROUND

It is advantageous in access performance to perform the recording and reproducing of an optical disk such as a DVD and a CD by CAV (Constant Angular Velocity), and therefore, the recording and reproducing by CAV is generally used. However, in this case, a transfer rate of a data reproduced from a disk and a recording rate of a data recorded to the disk change in a range of about 2.5 times. According to this, Jyh-Shin Pan et al., "Fully Integrated CMOS SoC for 56/18/16 CD/DVD-dual/RAM Applications with On-Chip 4-LVDS Channel WSG and 1.5 Gb/s SATA PHY", ISSCC 2006 DIGEST TECHNICAL PAPERS, pp. 266-268 (Non-Patent Document 1) describes a promotion of the power saving by changing a frequency of a clock supplied to units for an error correction, a modulation, a demodulation, and the like.

Also, Japanese Patent Application Laid-Open Publication No. 2003-91942 (Patent Document 1) describes that, in a signal process for reproducing a DVD, a trigger signal is issued each time one ECC block (ECC: Error Correcting Code) is reproduced from a disk, and a frequency of a clock supplied to units for an error correction, a demodulation, and the like changes depending on either the ECC process already ended or not when the trigger is generated.

Further, Japanese Patent Application Laid-Open Publication No. H11-232039 (Patent Document 2) describes that, in a signal process for reproducing a DVD, the signal processing is performed without a crash by setting an error correcting process time so as to match an end time of an access of an error correcting process circuit from/to a memory even if data accesses of a demodulating circuit and an output circuit from/to the memory is temporally increased.

SUMMARY

The above-described Non-Patent Document 1 describes that the processing clock frequency changes depending on the transfer rate, and specifically discloses NCO (Numerical Controlled Oscillator) for changing the clock frequency. However, the Non-Patent Document 1 does not disclose how the transfer rate is detected.

As a detection method, the above-described Patent Document 1 describes that either a correction is ended or not is determined in each reproducing (demodulating) of data for one ECC block. In Patent Document 1, while a target thereof is a power saving by setting the processing clock properly according to a change of a process time for the error correction depending on the quantity of the data errors, it is also possible to detect the change of the transfer rate from the disk because it is a relative comparison of a time for reproducing data from the disk with a process time for the correction. However, the determination is made in each reading of data for one ECC block from the disk, and therefore, a clock frequency has to be increased even if there are locally (for example, in one ECC block) a lot of data errors. Accordingly, a switching of a clock frequency is not optimally performed, and therefore, there is a problem in which an effect of the power saving is insufficient.

Also, Patent Document 2 describes that the error correcting process time changes depending on the quantity of memory accesses in a demodulating process and an output process. However, the change of the clock frequency for the power saving is not taken into consideration therein.

The present invention has been studied focusing on such a problem described above, and a main object of the present invention is to provide a technique capable of realizing a power saving by properly selecting (controlling) a clock frequency (master clock frequency) relating to a device for reproducing digital signals (with a demodulating process, an error correcting process, an output interface process, a memory control, and the like) or a device for recording digital signals (with an input interface process, an error-correcting-code generating process, a modulating process, a memory control, and the like).

The typical ones of the inventions disclosed in the present application will be briefly described as follows. Typical embodiments of the present invention are for a technique of a device for reproducing or recording digital signals (for example, a semiconductor integration circuit (IC)) to a medium such as a disk, and the typical embodiments are characterized by having a following configuration.

An embodiment includes a circuit for comparing a first parameter (counter value) updated (counted) in each process for one correcting block (one ECC block) in a demodulating circuit with a second parameter (counter value) updated in each process for one correcting block in a correcting circuit (error correcting circuit) (comparing circuit), and performing control to switch a frequency of a master clock (clock supplied to each of relative units) depending on a comparison result of the comparing circuit (for example, a clock controlling circuit). Thereby, the switch of the clock frequency can be performed both of when the demodulation for one correcting block is ended and when the correcting process for one correcting block is ended by using the switched master clock, so that the clock frequency is always properly controlled.

Also, for example, the clock controlling circuit is configured so as to select either of two types of a clock with a high frequency (first clock) and a clock with a low frequency (second clock). And, when the comparison result of the comparing circuit (difference between the parameters) shows a smaller value than, for example, a predetermined value (difference threshold value), the clock controlling circuit is made to select the first clock. In this manner, a ratio of a period of selecting the first clock and a period of selecting the second clock is controlled only by repeating the determination at the frequency of the master clock without performing a complex calculation at high speed such as the NCO described in Non-Patent Document 1. Therefore, it is possible to control so as to optimize an average frequency of the master clock. Also, even if the determination period is set to be one severalth of the frequency of the master clock, substantially the same result can be obtained.

Further, even in the local increase of the correcting process, the clock can be controlled to average by setting the difference threshold value to be large, so that a power reduction is efficiently performed.

Still further, even in a case of concentration of data reads from a memory by an output circuit, the error correcting process is delayed by putting a priority on a data transfer between a demodulating circuit and the memory and a data transfer between the output circuit and the memory rather than a data transfer between a correcting circuit and the memory and by extending the correcting process time for one correcting block depending on a reading time of data from the memory or a writing time of a corrected data to the memory. Thereby, the master clock can be properly controlled by comparing the first parameter and the second parameter and switching the frequency of the master clock depending on the comparison result.

Still further, an embodiment includes a circuit for comparing a third parameter (counter value) updated in each process for one correcting block in a modulating circuit with a fourth parameter (counter value) updated in each process for one correcting block in an error-correcting-code generating circuit (comparing circuit), and performing control to switch the frequency of the master clock depending on the comparison result of the comparing circuit. Thereby, the switching of the clock frequency can be performed both of when the modulation for one correcting block is ended and when the error-correcting-code generating process for one correcting block is ended by using the switched master clock, so that the clock frequency is always properly controlled.

A device for reproducing digital signals of the present invention is, for example, a device for reproducing a data from a medium having recorded therein a modulated data having a correcting block configured by attaching an error correcting code to a user data. And, the present device for reproducing digital signals includes: a demodulating circuit for performing a demodulating process to a data read from the medium; a memory for storing a data demodulated in the demodulating circuit; a correcting circuit for performing an error correcting process to a data read from the memory; an output circuit for outputting an error-corrected data from the memory to an external point; a memory controlling circuit for controlling a read and a write of a data between the memory and the demodulating circuit, the correcting circuit, and the output circuit; a comparing circuit for comparing a first parameter updated in each process for one correcting block in the demodulating circuit with a second parameter updated in each process for one correcting block in the correcting circuit; and a clock controlling circuit for switching a frequency of a clock supplied to the demodulating circuit, the correcting circuit, the output circuit, and the memory controlling circuit depending on a comparison result of the comparing circuit.

The effects obtained by typical aspects of the present invention will be briefly described below. According to typical embodiments of the present invention, a power saving can be realized by selecting a clock frequency properly.

Also, more particularly, by a configuration of selecting a clock with a high frequency and a clock with a low frequency, a ratio of a period of selecting the high clock and a period of selecting the low clock is controlled by only repeating the determination at the frequency of the master clock without performing a complex calculation at high speed such as the NCO described in Non-Patent Document 1. Therefore, it is possible to control so as to optimize an average frequency of the master clock. Further, even if the determination period is set to be one severalth of the frequency of the master clock, substantially the same result can be obtained.

Still further, more particularly, even in a case of concentration of data reads from the memory by the output circuit, the error correcting process is delayed by putting the priority on the data transfer between the demodulating circuit and the memory and the data transfer between the output circuit and the memory rather than the data transfer between the correcting circuit and the memory and by extending the correcting process time for one correcting block depending on the reading time of the data from the memory or the writing time of the corrected data to the memory, and the first parameter and the second parameter are compared and the frequency of the master clock is switched depending on the comparison result, so that the master clock is properly controlled.

Still further, more particularly, by comparing a third parameter with a fourth parameter (in the comparing circuit) and the frequency of the master clock is switched depending on the comparison result, the switching of the clock frequency can be performed both of when the modulation for one correcting block is ended and when the error-correcting-code generating process for one correcting block is ended by using the switched master clock, so that the clock frequency is always properly controlled.

BRIEF DESCRIPTIONS OF THE DRAWINGS

FIG. 4 is a timing chart showing an operation of the device according to the second embodiment;

FIG. 6 is a flow chart of a memory controlling unit in a device for reproducing digital signals according to a third embodiment of the present invention;

DESCRIPTIONS OF THE PREFERRED EMBODIMENTS

Hereinafter, embodiments of the present invention will be described in detail with reference to the accompanying drawings. Note that components having the same function are denoted by the same reference symbols throughout the drawings for describing the embodiment, and the repetitive description thereof will be omitted.

First Embodiment

A device for reproducing digital signals (device for reproducing an optical disk) according to a first embodiment of the present invention will be described with reference to FIG. 1 and FIG. 2. In the first embodiment, such a device for reproducing an optical disk is exemplified that a recorded signal is read to reproduce from a disk such as, for example, DVD and Blu-ray Disc (Trademark).

The first embodiment is characterized by switching up and down of the frequency of the master clock depending on a result of comparing a set value with a difference between a counter value in a demodulating process block and a counter value in an error correcting process block.

<Device (1)>

Figure 1:
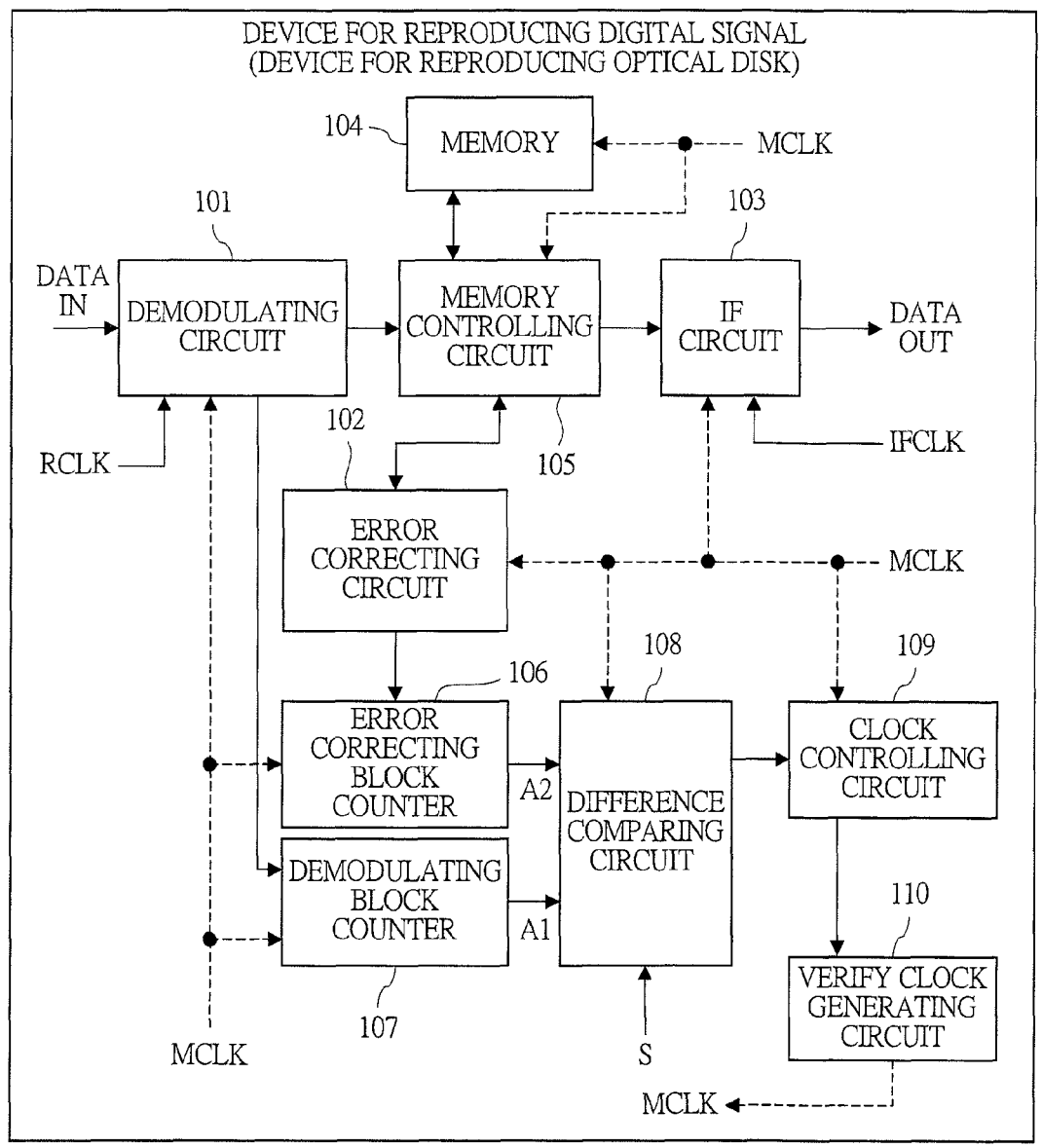
FIG. 1 is a diagram showing a configuration of a device for reproducing digital signals according to a first embodiment of the present invention.

FIG. 1 shows a block configuration of a process unit for reproducing digital signals in a device for reproducing an optical disk in a first embodiment. The device includes: a demodulating circuit 101; an error correcting circuit (correcting circuit) 102; an interface (IF) circuit 103 (output circuit); a memory 104; a memory controlling circuit 105; an error correcting block counter (second counter) 106; a demodulating block counter (first counter) 107; a difference comparing circuit (comparing circuit) 108; a clock controlling circuit 109; and a variable clock generating circuit 110. The present device can be realized as, for example, an LSI.

The demodulating circuit 101 performs a demodulating process as following a recording format (of the optical disk) by using a reproducing signal (DATA IN) which is digitized and a synchronous clock (RCLK) as an input.

A demodulated data is temporary stored in the memory 104 via the memory controlling circuit 105. The memory 104 is, for example, a DRAM. The memory controlling circuit 105 performs for the memory 104 to control a data read and write, to control a refresh operation, and the like.

The demodulated data stored in the memory 104 is read from the memory 104 via the memory controlling circuit 105 to the error correcting circuit 102 followed by performing the error correcting process to follow an error correcting code (ECC) attached as following the recording format, so that an error data on the memory 104 is rewritten to a correct data.

The error-corrected data on the memory 104 is outputted to an external point (for example, a host computer) via the memory controlling circuit 105 and the IF circuit 103.

An interface clock (IFCLK) for synchronizing with the external point is supplied to the IF circuit 103 (output circuit), and then, the IF circuit 103 outputs a data (DATA OUT). The interface is, for example, a Serial ATA Interface.

The demodulating block counter 107 is a counter circuit to which one increment (count-up) is added each time a process for one ECC block of a disk (DVD) in the demodulating circuit 101 ends.

The error correcting block counter 106 is a counter circuit to which one increment is added each time the error correcting process for one ECC block in the error correcting circuit 102 ends.

A parameter (A2) of the error correcting block counter 106 and a parameter (A1) of the demodulating block counter 107 are inputted to the difference comparing circuit 108, and then, the difference comparing circuit 108 calculates a difference therebetween. And, the difference comparing circuit 108 compares a magnitude relation between the difference and a predetermined value (difference threshold value) to determine. That is, the difference comparing circuit 108 compares to determine whether the correcting process of the error correcting circuit 102 is delayed longer than a predetermined value (volume) S or not compared to the demodulating process of the demodulating circuit 101.

Based on the determining result, the clock controlling circuit 109 controls up and down of a clock frequency in the variable clock generating circuit 110 (circuit for outputting the master clock (MCLK)). Note that also a determination which is performed in the clock controlling circuit 109 is same with the determination described above.

The master clock (MCLK) generated in the variable clock generating circuit 110 is supplied to each of relative units such as the demodulating circuit 101, the error correcting circuit 102, the IF circuit 103, the memory 104, the memory controlling circuit 105, the error correcting block counter 106, the demodulating block counter 107, the difference comparing circuit 108, and the clock controlling circuit 109.

The synchronous clock (RCLK) is used for a protection of synchronous signal detection and the demodulating process in the demodulating circuit 101, and the master clock (MCLK) is used for a transfer of the demodulated data from/to the memory controlling circuit 105.

After performing a transfer from/to the memory controlling circuit 105 by using the master clock (MCLK), the IF circuit 103 outputs a data in synchronization with the interface clock (IFCLK).

<Control (1)>

Next, a control of the frequency of the master clock in the device for reproducing an optical disk of FIG. 1 will be described with reference to FIG. 2. FIG. 2 shows a timing chart of a clock controlling operation. A chart (a) shows a count-up operation of the demodulating block counter 107 (parameter: A1), a chart (b) shows a count-up operation of the error correcting block counter 106 (parameter: A2), a chart (c) shows a counter difference value obtained by the difference comparing circuit 108 (A1-A2), a chart (d) shows a clock frequency up command transmitted from the clock controlling circuit 109 to the variable clock generating circuit 110, and a chart (e) shows a clock frequency down command transmitted from the clock controlling circuit 109 to the variable clock generating circuit 110. Time "t1" and others indicate timings.

The demodulating process in the demodulating circuit 101 and a storage of the demodulation data (demodulated data) into the memory 104 start from a point (t1) of an arrow "a" (indicating a demodulating process start) in the chart (a). In this manner, the value (parameter) A1 is counted up from 0 to 1, 2, 3, . . . in the demodulating block counter 107 each time the demodulating process for one block (one ECC block) ends. A cycle of the count up is determined as following a channel bit rate of a data reproduced from the disk. Note that the synchronous clock (RCLK) is configured in synchronization with the channel bit rate.

Since the demodulated data for one ECC block is stored at a point (t2) of an arrow "b" (indicating a correcting process start) in the chart (b), the error correcting process in the error correcting circuit 102 starts. In this manner, the value (parameter) A2 is counted up from 0 to 1, 2, 3, . . . in the error correcting block counter 106 each time the error correcting process for one ECC block ends.

The chart (c) shows a difference (A1-A2) between the counters of the charts (a) and (b) (respective parameters are referred to as A1 and A2). First, in a period indicated by "201" (t1 to t2), both of A1 in the chart (a) and A2 in the chart (b) are 0, so that the difference therebetween is also 0. In a next period indicated by "202" (t2 to t3), while A1 becomes 1 by the modulation process end for one ECC block in the chart (a), ECC (the error correcting process) of the chart (b) is during an execution of ECC for a first ECC block, and therefore, A2 of the counter value is still 0, so that the difference therebetween is 1.

For example, to data for one ECC block obtained by the demodulating process in the period of t1 to t2, the error correcting process is applied in the next period of t2 to t4. And, for example, to data for one ECC block obtained by the demodulating process in the period of t2 to t3, the error correcting process is applied in the next period of t4 to t6.

Figure 2:
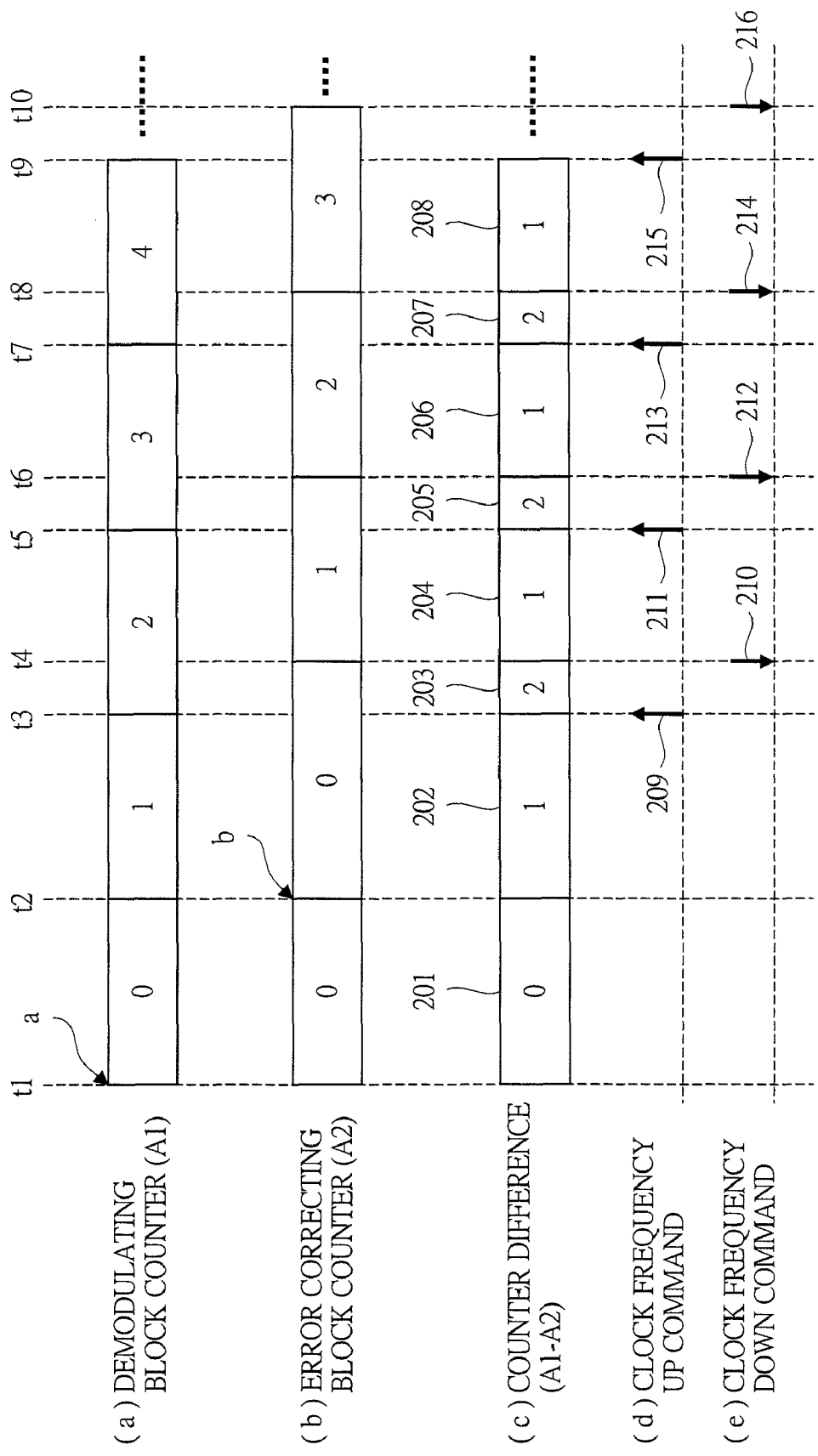
FIG. 2 is a timing chart showing an operation of the device according to the first embodiment.

FIG. 2 is a case in which an initial value of the frequency of the master clock is too low to perform the error correcting process for one ECC block within a demodulating process time for one ECC block. That is, the period of t2 to t4 (202 and 203) to be the error correcting process time for one ECC block is longer than the period of t1 to t2 (201) to be the demodulating process time for one ECC block in FIG. 2.

Therefore, the point (t4) counting up to be 1 according to the end of the error correcting process for one ECC block started from the correcting process start point (t2) is later than the point (t3) counting up to be 2 in the demodulating block counter 107 in the chart (a). Therefore, the difference value in the chart (c) becomes 2 in the period indicated by 203 (t3 to t4).

Here, the predetermined value used for the comparison in the difference comparing circuit 108 ("S" in FIG. 1 of the setting value of the difference threshold value) is assumed to be 2 in this case. Note that the configuration is such that the setting value (S) is internally set by the present system in advance or settable by a user.

Accordingly, at the timing (t3) of the beginning where the difference becomes 2 in the period of 203, a clock frequency up command 209 in the chart (d) is outputted from the clock controlling circuit 109, and then, the variable frequency clock generating circuit 110 follows the command to raise the frequency of the master clock (MCLK).

The correcting process continues during 203 with the state of raising up the frequency of the master clock (MCLK), and when the correcting process is ended (t4), A2 in the chart (b) is counted up to 1.

Since A1 in the chart (a) is 2 and A2 in the chart (b) is 1 at this timing (t4), the difference in the chart (c) goes back to 1 at the period indicated by 204 (t4 to t5). Since 1 of the difference is smaller than the setting value S=2 at the timing (t4) of the beginning of this period 204, a clock frequency down command 210 in the chart (e) is outputted from the clock controlling circuit 109, and then, the variable clock generating circuit 110 follows this command to lower the frequency of the master clock (MCLK).

The same control is performed after that, and a clock frequency up command 211 is outputted to raise the frequency of the master clock at the beginning (t5) where the difference is 2 in 205 (t5 to t6). A clock frequency down command 212 is outputted to lower the frequency of the master clock at a beginning (t6) where the difference is 1 in 206 (t6 to t7). A clock frequency up command 213 is outputted to raise the frequency of the master clock at a beginning (t7) where the difference is 2 in 207 (t7 to t8). A clock frequency down command 214 is outputted to lower the frequency of the master clock at a beginning (t8) where the difference is 1 in 208 (t8 to t9). Similarly, a clock frequency up command 215 and a clock frequency down command 216 are outputted to control up and down of the frequency of the master clock.

As described above, according to the first embodiment, the clock (master clock) supplied to each of circuit units such as the error correcting circuit 102 is raised when the error correcting process is delayed, and the master clock is lowered when the error correcting process is recovered from the delay. Therefore, a time required for the error correcting process for one ECC block goes close to substantially the same with a time required for the demodulating process for one ECC block. That is, the average frequency of the clocks during one ECC block is controlled so as to be optimum. Therefore, a device for reproducing digital signals having extremely good power efficiency can be realized. The clock can be optimally controlled depending on the quantity of the error when the error correcting process is performed.

Note that, as an example of a control of the frequency of the master clock in the first embodiment, the control is preferable to be performed as follows. That is, the frequency of the controlled master clock (MCLK) is raised to be a clock frequency F1 described below or higher as a target value according to the clock frequency up command, and the frequency of the controlled master clock (MCLK) is lowered to be a clock frequency F2 described below or lower as the target value according to the clock frequency down command. F1 is made to be a clock frequency capable of being processed even if a data volume corrected by the error correcting process is largest. F2 is made to be a clock frequency capable of being processed when a data corrected by the error correcting process is 0.

Note that the setting value (S) compared by the difference comparing circuit 108 is made to be 2 in the description of the first embodiment. However, a larger value can be used for the setting value if a capacity of the memory 104 is sufficient, so that the clock (MCLK) tends to be controlled to be lower, thereby making the effect further effective. This is because, even when there is a period having a large amount of errors temporary, the difference between the error correcting block counter 106 and the demodulating block counter 107 is compared to be determined in a state where the process time is integrated with a process time during a period having less errors, so that an averaging (equalization) is performed.

Note that, while the demodulating block counter 107 and the error correcting block counter 106 are provided and the difference therebetween is compared with the setting value in the first embodiment, such a configuration may be used that the setting value is compared with a difference between an address used for writing a demodulated data from the demodulating circuit 101 to the memory 104 and an address used for reading and writing in the error correcting circuit 102 from/to the memory 104. Also in this case, if the configuration has an address comparison in each of ECC blocks, a small-scale circuit can be realized.

Also, as for the setting value (S), it is advantageous in power saving in the case of obtaining a large difference by setting S to be large, and a size of the memory 104 can be small in the case of obtaining a small difference by setting S to be small.

Further, parameters (A1 and A2) of respective counters (106 and 107) are updated in each process for one correcting (ECC) block in the first embodiment. However, the parameters are not limited to follow this manner, and they may be a first parameter (A1) that is updated depending on a volume of a data to which the demodulating process is performed by the demodulating circuit 101 and a second parameter (A2) that is updated depending on a volume of a data to which the error correcting process is performed by the error correcting circuit 102.

Second Embodiment

Next, a device for reproducing digital signals (device for reproducing an optical disk) according to a second embodiment of the present invention will be described with reference to FIG. 3 to FIG. 5. A different point of the second embodiment from the first embodiment is to select and control two types of master clocks.

<Device (2)>

Figure 3:
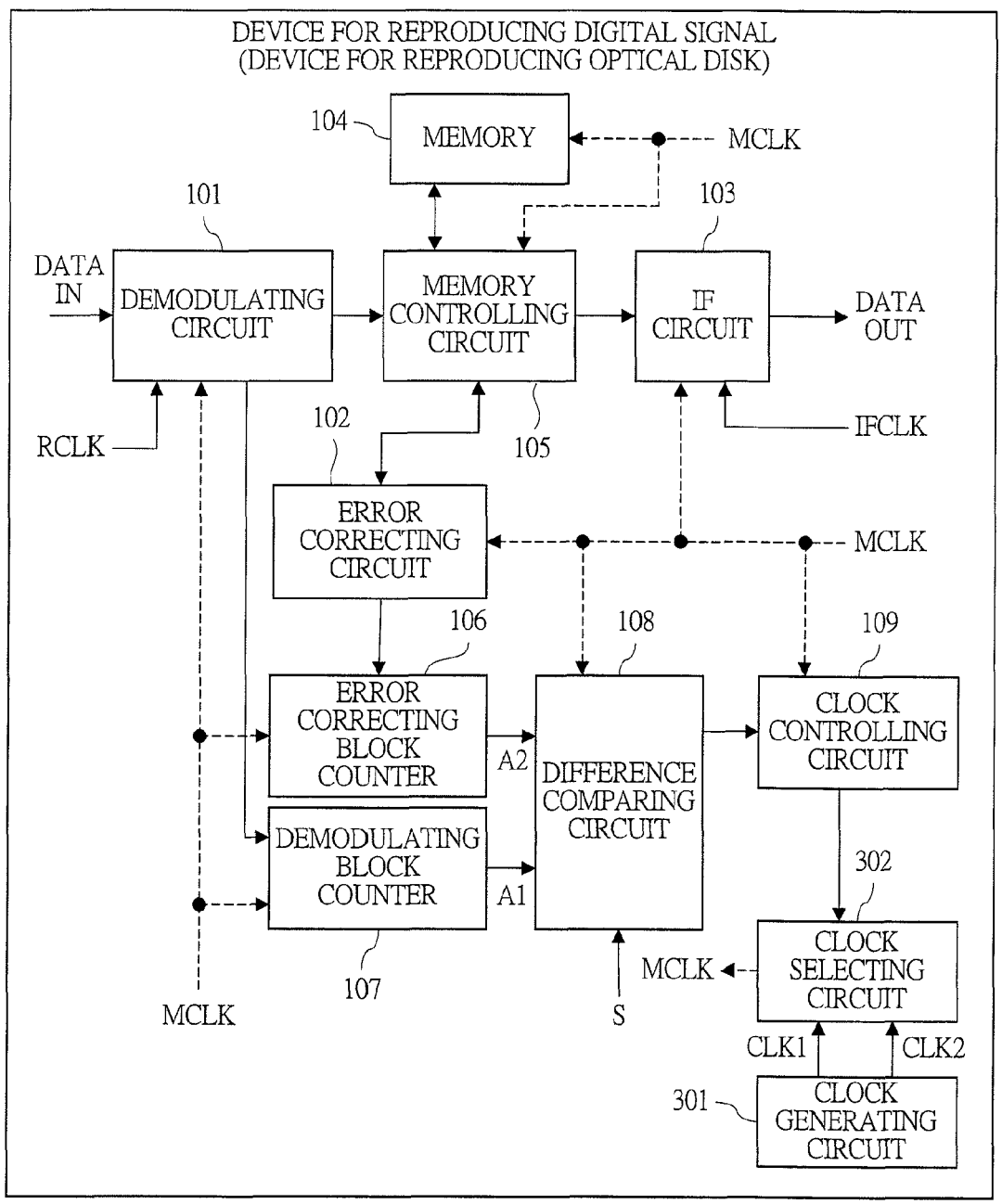
FIG. 3 is a diagram showing a configuration of a device for reproducing digital signals according to a second embodiment of the present invention.

FIG. 3 shows a block configuration of a unit for a digital signal reproducing process in a device for reproducing an optical disk in a second embodiment. Components having the same symbol are substantially the same in the operation and the like with those of the first embodiment. A different point of FIG. 3 from FIG. 1 is to provide a clock generating circuit 301 and a clock selecting circuit 302 instead of the variable clock generating circuit 110. The clock generating circuit 301 generates two types of a clock with a high frequency (first clock: CLK1) and a clock with a low frequency (second clock: CLK2). The clock selecting circuit 302 selects either of two types of the clocks (CLK1 or CLK2) from the clock generating circuit 301 as following the clock frequency up command and the clock frequency down command from the clock controlling circuit 109 to output the selected one as the master clock (MCLK) to each of units. The manner in the first embodiment is described about a relative up and down of the clock frequency and is not specified in two types of clocks.

<Control (2)>

A frequency control of the master clock in the device of FIG. 3 will be described with reference to FIG. 4. FIG. 4 shows a timing chart of a clock controlling operation in the second embodiment. The charts (a) to (c) are same with those of FIG. 2. A chart (d) shows a clock frequency up command transmitted from the clock controlling circuit 109 to the clock selecting circuit 302, and a chart (e) shows a clock frequency down command transmitted from the clock controlling circuit 109 to the clock selecting circuit 302. Operations of (a) to (e) are substantially the same with those of FIG. 2.

And, a chart (f) shows the frequency of the master clock (MCLK) obtained by the clock (CLK1 or CLK2) selected in (d) and (e). The present example describes a case where the high clock (CLK1) is 45 MHz and the low clock (CLK2) is 30 MHz in the clock generating circuit 301. These clocks can be generated easily by, for example, a divide-by-2 frequency and a divide-by-3 frequency from a clock with 90 MHz in the clock generating circuit 301.

The present example is a case in which CLK2 with 30 MHz is selected as an initial state. CLK2 with 30 MHz is switched to CLK1 with 45 MHz when the clock frequency up command is inputted (for example, timing t3), and CLK2 with 30 MHz is selected from CLK1 with 45 MHz when the clock frequency down command is inputted (for example, timing t4).

A feedback is performed in a control of a ratio of selecting CLK2 with 30 MHz and CLK1 with 45 MHz such that the correcting process time for one ECC block gets close to the demodulating process time for one ECC block. Therefore, the average frequency of the master clock is controlled so as to be optimum.

According to the second embodiment, the optimum control of the master clock can be realized by a simple frequency-divider (clock generating circuit 301) and a simple selecting circuit (clock selecting circuit 302), thereby becoming preferable for the power saving.

Note that, the clock with a higher frequency (CLK1) is desired to have the clock frequency F1 or higher, and the clock with a lower frequency (CLK2) is desired to have the clock frequency F2 or lower. However, if the clock with a higher frequency (CLK1) has the clock frequency F1 or higher, even if the clock with a lower frequency (CLK2) can select only a clock with a lowest frequency or higher that is capable of being processed in a state where a data corrected by the error correcting process is 0, the clock frequencies are averaged easily by having a sufficient capacity in the memory 104 and setting the setting value (S) compared by the difference between the counters (106 and 107) to be large, so that the manner has the same effect.

Also, since a time for the switching of the two types of clocks (CLK1 and CLK2) is limited compared to the process time for one ECC block, a control determined by an absolute time which is not proportional to a linear velocity of reproduction such as a refresh control of DRAM (memory 104) can be easily performed by switching the control in each of clocks.

<CAV Reproduction>

Next, there will be described a control of the frequency of the master clock when CAV (Constant Angular Velocity) reproduction is performed to a DVD formatted for CLV (Constant Linear Velocity) in the device for reproducing an optical disk of FIG. 3 with reference to FIG. 5 as a control example of the second embodiment. The description says that the control is handled well by the present configuration even if the transfer rate (synchronous clock) changes.

Figure 5A:
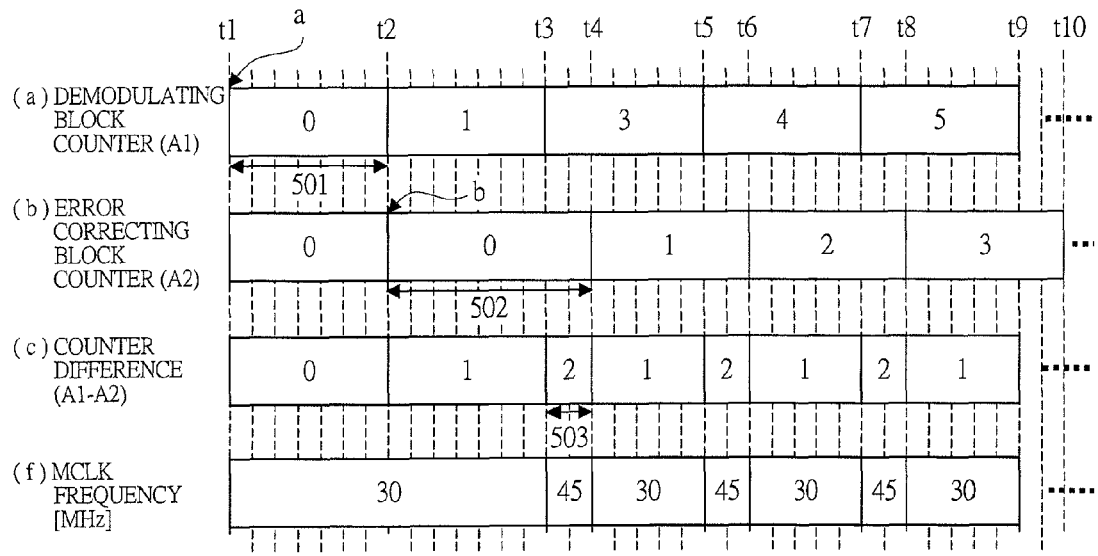
FIG. 5A is a timing chart showing an operation adjusted for a CAV reproduction in the second embodiment.
Figure 5B:
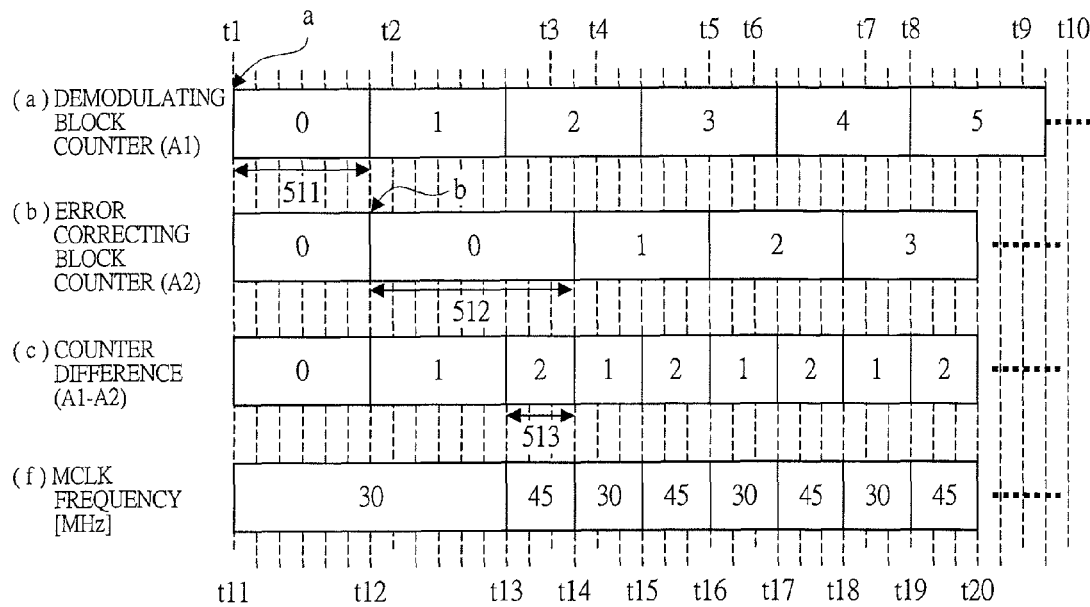
FIG. 5B is a timing chart showing an operation adjusted for a CAV reproduction in the second embodiment.

FIG. 5A and FIG. 5B show timing charts respectively showing a clock controlling operation in an inner periphery side and an outer periphery side of the disk in the case of performing the CAV reproduction to the DVD. FIG. 5A shows a master clock control in the inner periphery side (that is a low linear velocity) in performing the CAV reproduction, and operations of respective components (a) to (c) and (f) are substantially the same with those of FIG. 4. Compared to this, although a schematic figure in FIG. 5B is same with that of FIG. 5A, FIG. 5B shows the operation in the outer periphery side (that is a high linear velocity), and therefore, the transfer rate is high (the frequency of the synchronous clock (RCLK) is high) and an increment (count up) cycle in the demodulating block counter 107 is shorter. For example, while a period of A1=0 in FIG. 5A (t1 to t2) 501 has a length for 7 units of a scale unit shown in the figure, and a period of A1=0 in FIG. 5B (t11 to t12) 511 has a length for 6 units.

Therefore, the feedback is started to balance at a point (t14) where a period 513 in which the difference is 2 (t13 to t14) in the counter difference of (c) in FIG. 5B is longer than that in FIG. 5A (period 503). Accordingly, the selection of either of clocks with 33 MHz and 45 MHz (CLK2 and CLK1) balances at a point where there are more intervals selecting CLK1 with 45 MHz. Thereby, the ratio of 33 MHz and 45 MHz changes as gradually increasing the ratio of 45 MHz from the inner periphery side toward the outer periphery side of the disk.

As described above, according to the second embodiment, the clock can be optimally controlled not only for the quantity of the error when the error correcting process is performed but also (for example, in the case of CAV reproduction) for the change of the reproducing velocity (transfer rate) from the disk, so that the power saving is effectively realized. The present control can be also used and effective for examples other than the CAV reproduction. It is considered that the effect is high in the case of CAV reproduction in particular.

Third Embodiment

Figure 7A:
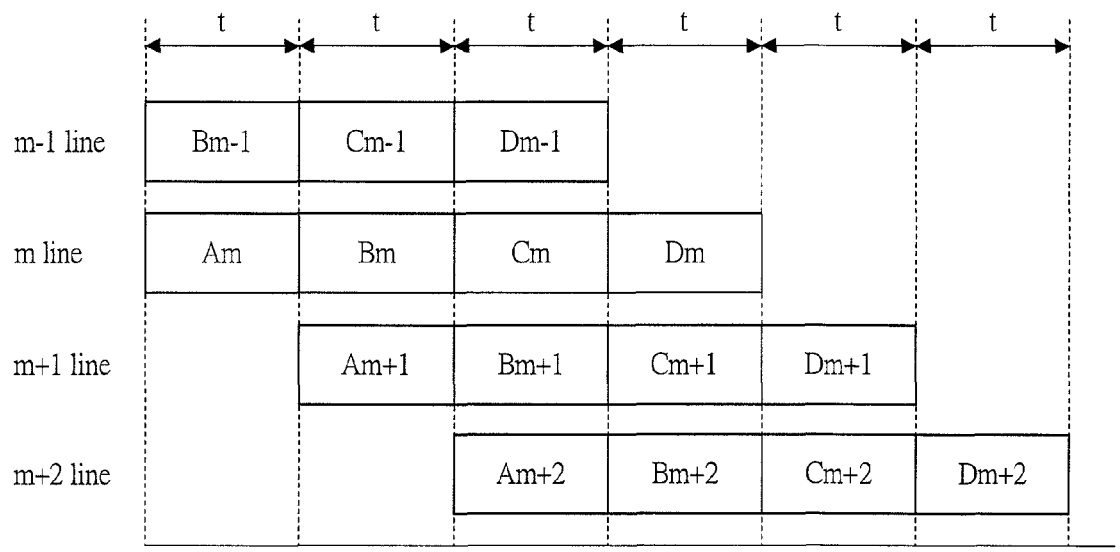
FIG. 7A is a timing chart showing an operation of an error correcting circuit unit in the third embodiment.
Figure 7B:
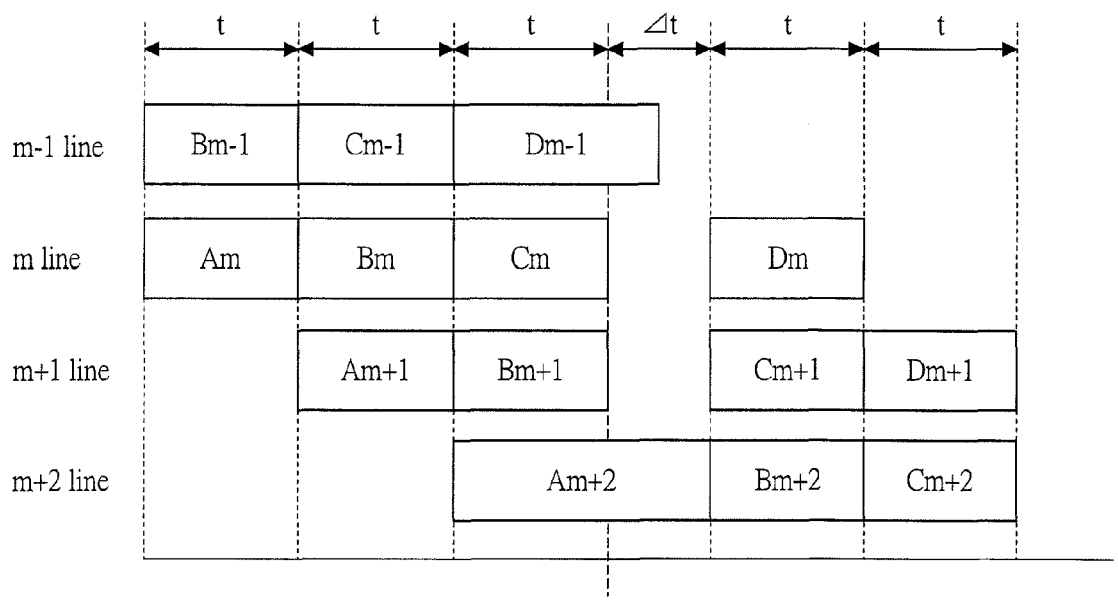
FIG. 7B is a timing chart showing an operation of an error correcting circuit unit in the third embodiment.
Figure 8A:
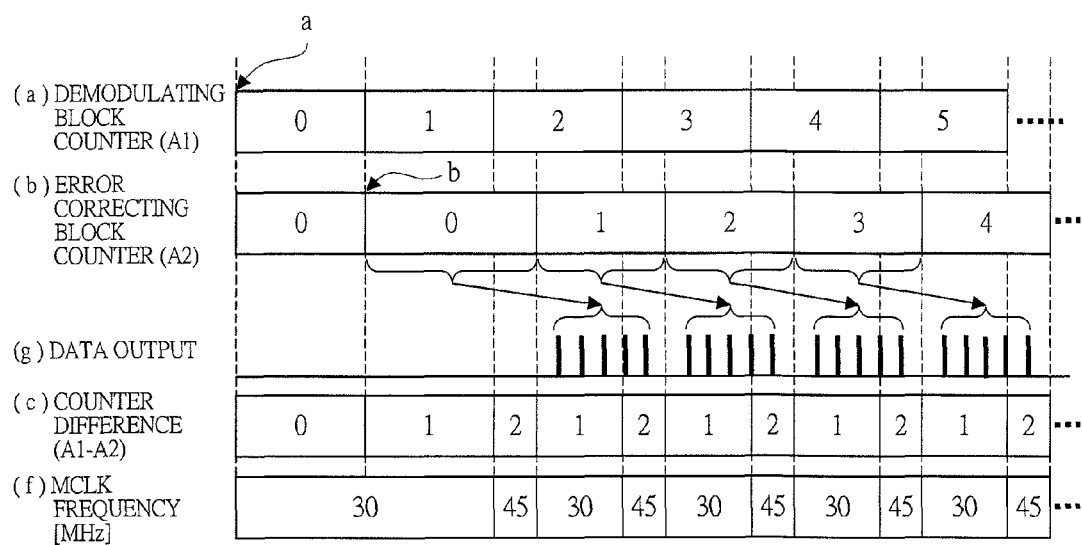
FIG. 8A is a timing chart showing an operation of the device according to the third embodiment.
Figure 8B:
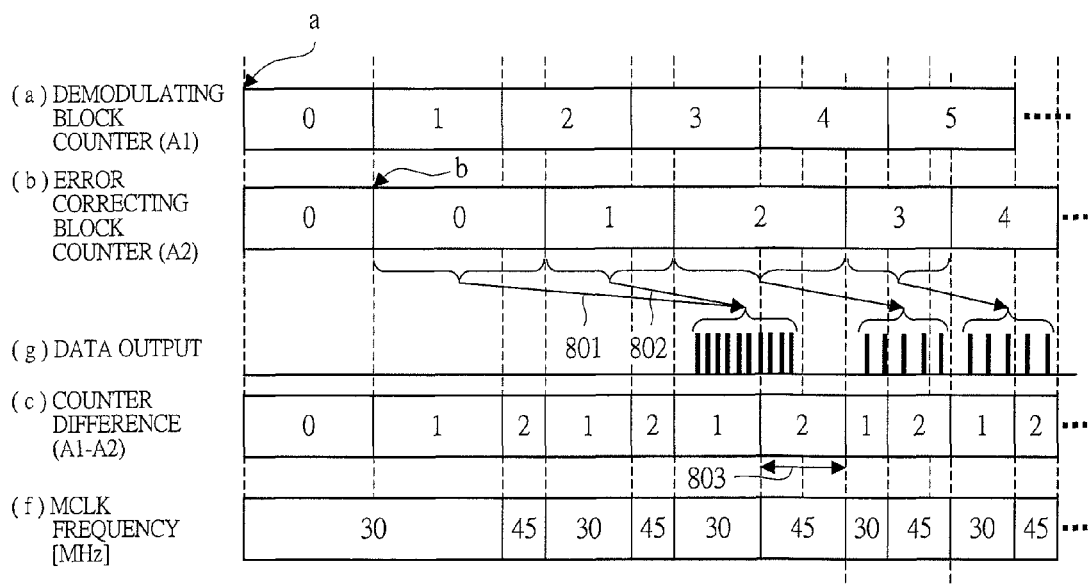
FIG. 8B is a timing chart showing an operation of the device according to the third embodiment.

Next, a device for reproducing digital signals (device for reproducing an optical disk) according to a third embodiment of the present invention will be described with reference to FIG. 6 to FIG. 8. The third embodiment is for further efficiently realizing the power saving by characterizing controls of the memory controlling circuit 105 and the error correcting circuit 102 (controls performed by the circuits) in FIG. 1 or FIG. 3 described above. FIG. 6 shows a flow chart of the control of the memory controlling circuit 105, FIGS. 7A and 7B show timing charts of an operation of the error correcting circuit 102, and FIGS. 8A and 8B show timing charts of an operation of the device of the third embodiment.

<Memory Control>

In FIG. 6, the operation of the memory controlling circuit 105 of the device according to the third embodiment will be described ("S" indicates a process step). Once the operation is started, the memory controlling circuit 105 determines either ending or continuing of the process by verifying an end command and the like in S601. If the continuous of the process is determined, the memory controlling circuit 105 waits for a generation of an access request (DRAM ACCESS REQUEST) for DRAM (memory 104) in S602. When the access request is generated, the memory controlling circuit 105 determines whether the request is transmitted from the demodulating circuit 101 (that is the demodulating process) or not in S603. If the request is determined as the one transmitted from the demodulating circuit 101, the memory controlling circuit 105 performs an access (demodulating access) from the demodulating circuit 101 to the DRAM (memory 104) in S604. That is, the memory controlling circuit 105 controls to write a demodulated data to the memory 104. If the request is not transmitted from the demodulating circuit 101, then, the memory controlling circuit 105 determines whether the request is transmitted from the output circuit (IF circuit 103) or not in S605. If the request is determined as the one transmitted from the output circuit, the memory controlling circuit 105 performs an access (outputting access) from the output circuit to the DRAM (memory 104) in S606. That is, the memory controlling circuit 105 controls to read a demodulated and error-corrected data from the memory 104 to transmit to the output circuit. If the request is not transmitted from the output circuit, then, the memory controlling circuit 105 performs an access (ECC access) from the error correcting circuit 102 to the DRAM (memory 104) in S607. That is, the memory controlling circuit 105 controls an operation of reading the demodulated data from the memory 104 to transmit to the error correcting circuit 102 or an operation of writing the error-corrected data from the error correcting circuit 102 to the memory 104.

That is, in the third embodiment, the accesses by the access request to the DRAM (memory 104) are controlled in a priority order of the demodulating circuit 101, the output circuit (IF circuit 103), and the error correcting circuit 102 in this order. The memory controlling circuit 105 puts the priority on a data transfer between the demodulating circuit 101 and the memory 104 and a data transfer between the IF circuit 103 and the memory 104 rather than a data transfer between the error correcting circuit 102 and the memory 104.

<Error Correcting Process>

In FIGS. 7A and 7B, the operation of the error correcting circuit 102 of the device according to the third embodiment will be described. FIG. 7A shows a basic case (case in which the memory accesses do not concentrate) and FIG. 7B shows a case in which the memory accesses concentrate.

As shown in FIG. 7A, the error correcting process is divided into a syndrome calculation (syndrome calculation: referred to as "A") for calculating a syndrome from an inputted data (demodulated data), a generation of an error locator polynomial and an error evaluator polynomial for generating a polynomial from the obtained syndrome (polynomial generation: referred to as "B"), a calculation for obtaining an error location and an error value (error location and error value calculation: referred to as "C"), and a correcting process for the error data (error data correction: referred to as "D"). A pipeline process is provided for each of ECC (error correcting process) sequences of the ECC block so as to divide by time "t" (one pipeline time) as shown in the figure. "m" indicates a row of each of sequences. For example, each of "Am", "Bm", "Cm", and "Dm" is sequentially performed in this order in the time t in an "m-th" row.

Among the respective divided processes (A to D), the syndrome calculation "A" is calculated from an input data transmitted from the memory 104, and therefore, the process time also changes depending on a time required for the data access from/to the memory 104. Further, the error data correction "D" rewrites the error data on the memory 104, and therefore, the process time also similarly changes depending on a time required for the data access from/to the memory 104.

Still further, the process times of the polynomial generation "B" and the error location and error value calculation "C" are configured so as to be shorter than the process times required for the syndrome calculation "A" and the error data correction "D" in a case that a condition of the data access from/to the memory 104 is best.

FIG. 7B shows a case that the processes of the error data correction "D" and the syndrome calculation "A" are not ended within the time t. In this case, a time for the pipeline process t+Δt is determined in a longest process among respective processes of the pipeline (in the syndrome calculation "A" in the case of FIG. 7B). Δt is an extended period of time of the pipeline. That is, one pipeline time "t" for the error correcting process is extended for another time Δt as following the state of the access from/to the memory 104.

The correcting process time for one correcting block in the error correcting circuit 102 changes depending on a reading time of the data from the memory 104 and a writing time of the error-corrected data to the memory 104. Also, the writing time of the error-corrected data in the error correcting circuit 102 to the memory 104 changes depending on a volume of a data error contained in the reproducing data. Further, the correcting process time for one correcting block in the error correcting circuit 102 changes depending on the size of a volume of the demodulated data in the demodulating circuit 101 per constant time and the size of a volume of the outputted data in the IF circuit 103 per constant time.

<Data Output>

Next, there will be described an operation of a digital signal reproducing circuit of the device according to the third embodiment provided with the memory controlling circuit 105 shown in FIG. 6 and the error correcting circuit 102 shown in FIGS. 7A and 7B with reference to FIG. 8A and FIG. 8B. Operations of the charts (a) to (c) and (f) in FIG. 8A are same with those of FIG. 5A, and a state of a data output shown in (g) is added to those of FIG. 5A.

A data for one ECC block is outputted each time the process for one ECC block by the error correcting process ends in the chart (g) of FIG. 8A, and an interval of the data output is evenly distributed. For example, a block data processed by the error correcting process in a period having a value of 0 which starts at an arrow "b" in (b) is outputted by the IF circuit 103 so as to divide into a plurality of times with even interval at a next period having the value of 1.

Compared to this, FIG. 8B shows a case that an error-correcting-processed data in periods indicated by values of 0 and 1 in the error correcting block counter 106 are outputted at once as shown by arrows 801 and 802. Since the access volume of the memory 104 is increased in this period when the data outputs concentrate, the time required for the access of the error correcting process is increased, and therefore, the error correcting process time is increased. Accordingly, a period having the value of 2 in the error correcting block counter 106 becomes long. Thereby, a period 803 having the value of 2 in the counter difference of (c) becomes long. And therefore, the period of selecting the clock with a high frequency of 45 MHz (CLK1) becomes long.

As described above, according to the third embodiment, when the volume of the process such as the data output is increased by the request from the external device (host PC and the like connected to the IF circuit 103) so that the access volume of the memory 104 is increased, the error correcting process time is automatically extended, and therefore, the period having the large difference between counters (106 and 107) is extended so that the period of selecting the clock with a high frequency becomes long. Thereby, the clock (MCLK) can be optimally controlled not only for the change of the reproducing process rate but also for the increase of the access volume of the memory 104. That is, the power saving can be effectively realized.

<Operation Flow>

Figure 9:
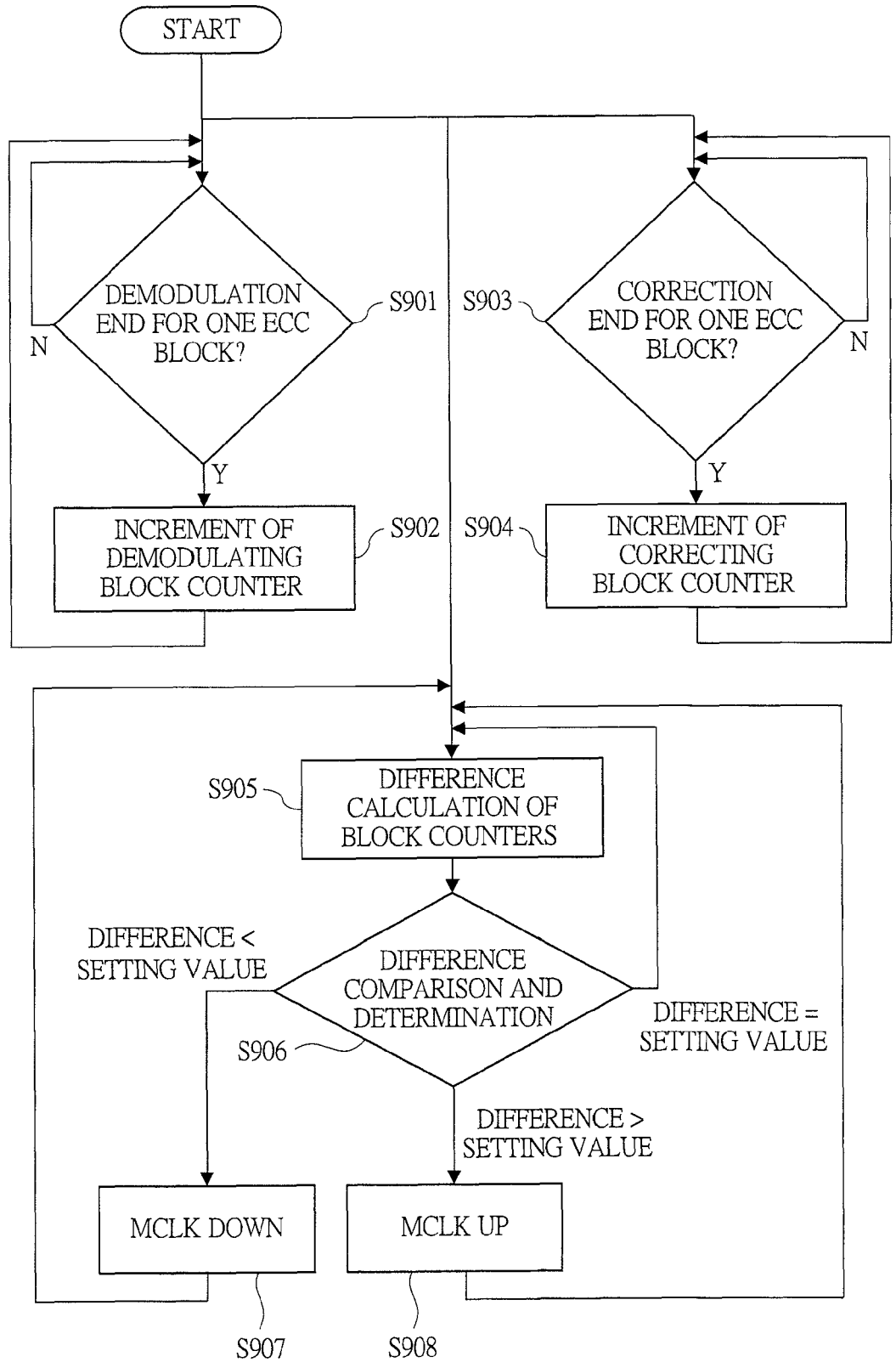
FIG. 9 is a flow chart showing an operation of the devices according to the first embodiment and the third embodiment.

FIG. 9 shows an operation flow for optimally controlling the master clock in the device and the like according to the first embodiment and the third embodiment. Once the operation is started, three processes are executed so as to loop in parallel. A first loop is a loop for the demodulating process by the demodulating circuit 101. The demodulating process is executed, and then, an end timing is detected (an end of the demodulation for one ECC block is determined) in S901. If the end is detected, one increment is added to the demodulating block counter 107 in S902.

A second loop is a loop for the error correcting process by the error correcting circuit 102. The error correcting process is executed, and then, an end timing is detected (an end of the correction for one ECC block is determined) in S903. If the end is detected, one increment is added to the error correcting block counter 106 in S904.

A third loop is a loop for the clock control by the difference determination. The difference between the demodulating block counter 107 and the error correcting block counter 106 are calculated in S905. The difference is compared to be determined by the comparing circuit 108 in S906. The frequency of the master clock is lowered in S907 if the difference is smaller than the predetermined setting value (S), the frequency of the master clock is raised in S908 if the difference is larger than the setting value (S), and the frequency of the master clock is maintained if the difference is equal to the setting value (S).

Note that a range of up and down of the frequency of the master clock is made to be within a limited range. Also, the frequency is maintained if the difference is equal to the setting value (S) as described above. However, the same effect can be obtained even in up or down of the frequency. Further, as same with the timing chart of FIG. 2, up and down of the frequency of the clock can be performed only at a moment when the difference is over or under the setting value (S).

Fourth Embodiment

Next, a device for recording digital signals (device for recording an optical disk) according to a fourth embodiment of the present invention will be described with reference to FIG. 10 to FIG. 11. The device for recording an optical disk such as, for example, a DVD and a Blu-ray Disc is exemplified.

<Device (4)>

Figure 10:
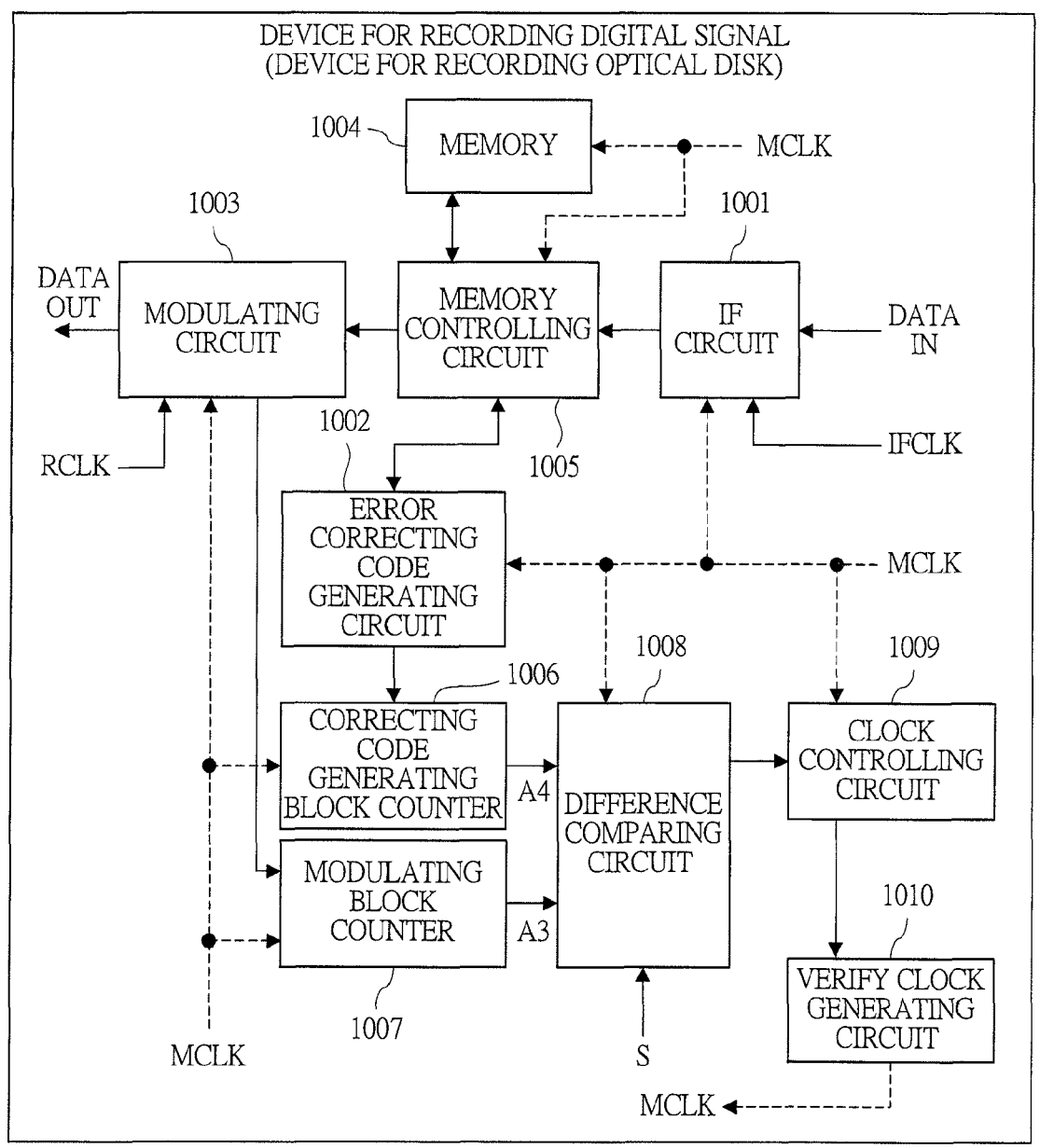
FIG. 10 is a diagram showing a configuration of a device for recording digital signals according to a fourth embodiment of the present invention.

FIG. 10 shows a block configuration of a process unit for recording digital signals in the present device for recording an optical disk. The present device includes: an interface (IF) circuit 1001 (input circuit); an error-correcting-code generating circuit 1002; a modulating circuit 1003; a memory 1004; a memory controlling circuit 1005; an error-correcting-code generating block counter (fourth counter) 1006; a modulating block counter (third counter) 1007; a difference comparing circuit (comparing circuit) 1008; a clock controlling circuit 1009; and a variable clock generating circuit 1010.

The interface (IF) circuit 1001 is a circuit to which a user data (UDATA IN) provided from an external point and a synchronous clock (interface clock) (IFCLK) are inputted, and the inputted data are temporary stored in the memory 1004 via the memory controlling circuit 1005.

The user data temporary stored in the memory 1004 is read to the error-correcting-code generating circuit 1002 via the memory controlling circuit 1005. In the error-correcting-code generating circuit 1002, an error correcting code (ECC) is generated as following a recording format of the disk for the user data, and the generated error correcting code is temporary stored in the memory 1004 via the memory controlling circuit 1005.

The data in which the error correcting code is attached to the user data (ECC attached data) is transmitted from the memory 1004 to the modulating circuit 1003 via the memory controlling circuit 1005. The modulating circuit 1003 modulates the inputted data (ECC attached data) as following the recording format to output the data in synchronization with a recording clock (synchronous clock) (WCLK) synchronized with a wobble of a track of the disk. The output data is recorded to the disk by well-known hardware (analog front end, pick up, and the like) not shown in the figure.

The modulating block counter 1007 is a counter circuit to which one increment is added each time the process for one ECC block of DVD ends in the modulating circuit 1003 (Parameter: A3). The error-correcting-code generating block counter 1006 is a counter circuit to which one increment is added each time the error-correcting-code generating process for one ECC block ends in the error-correcting-code generating circuit 1002 (Parameter: A4). The difference comparing circuit 1008 determines a magnitude relation between, for example, a predetermined value (difference threshold value) and a difference between the error-correcting-code generating block counter 1006 (A4) and the modulating block counter 1007 (A3). That is, the difference comparing circuit 1008 determines whether the correcting process of the error-correcting-code generating circuit 1002 is delayed longer than the predetermined value (volume) compared to the modulating process of the modulating circuit 1003 or not. Based on the determining result, the clock controlling circuit 1009 controls the up and down of a clock frequency in the variable clock generating circuit 1010. The master clock (MCLK) generated in the variable clock generating circuit 1010 is supplied to relative circuit units such as the IF circuit 1001, the error-correcting-code generating circuit 1002, the modulating circuit 1003, the memory 1004, the memory controlling circuit 1005, the error-correcting-code generating block counter 1006, the modulating block counter 1007, the difference comparing circuit 1008, and the clock controlling circuit 1009.

In the modulating circuit 1003, a synchronous clock (recording clock) (WCLK) is used for the modulating process, and the master clock (MCLK) is used for a data transfer from/to the memory controlling circuit 1005. In the IF circuit 1001, the master clock (MCLK) is used for the user data inputted in synchronization with a synchronous clock (interface clock) (IFCLK) to perform the transfer from/to the memory controlling circuit 1005.

In the error-correcting-code generating circuit 1002, the error-correcting-code generating process time for one correcting block changes depending on the size of a volume of the modulated data in the modulating circuit 1003 per constant time and the size of a volume of the output data in the IF circuit 1001 per constant time.

<Control (4)>

A control of the frequency of the master clock in the device of FIG. 10 will be described with reference to FIG. 11. FIG. 11 shows a timing chart showing a clock controlling operation. A chart (a) shows a count-up operation of the error-correcting-code generating block counter 1006 (A4), a chart (b) shows a count-up operation of the modulating block counter 1007 (A3), a chart (c) shows a difference value between the counters obtained by the difference comparing circuit 1008 (A4-A3), a chart (d) shows a clock frequency up command transmitted from the clock controlling circuit 1009 to the variable clock generating circuit 1010, and a chart (e) shows a clock frequency down command transmitted from the clock controlling circuit 1009 to the variable clock generating circuit 1010.

The error-correcting-code generating process is started from a point of an arrow "a" in the chart (a). The counter value (parameter) A4 is counted up from 0 to 1, 2, 3, 4, 5, . . . each time the error-correcting-code generating process for one ECC block ends. When the error-correcting-code generated data for three ECC blocks is stored at a point (timing t4) of an arrow "b" in the chart (b), it is determined that sufficient data are buffered so that the modulating process of (b) is started. The counter value (parameter) A3 is counted up from 0 to 1, 2, . . . each time the modulating process for one ECC block ends. A cycle of the count-up is determined so as to follow a channel bit rate (the synchronous clock (recording clock) (WCLK) obtained by the channel bit rate) of the data recorded in the disk.

The chart (c) shows a difference between the counters (A4-A3) shown in the charts (a) and (b). In a period of 1101, both counters of (a) and (b) are 0, and the difference therebetween is also 0.

Figure 11:
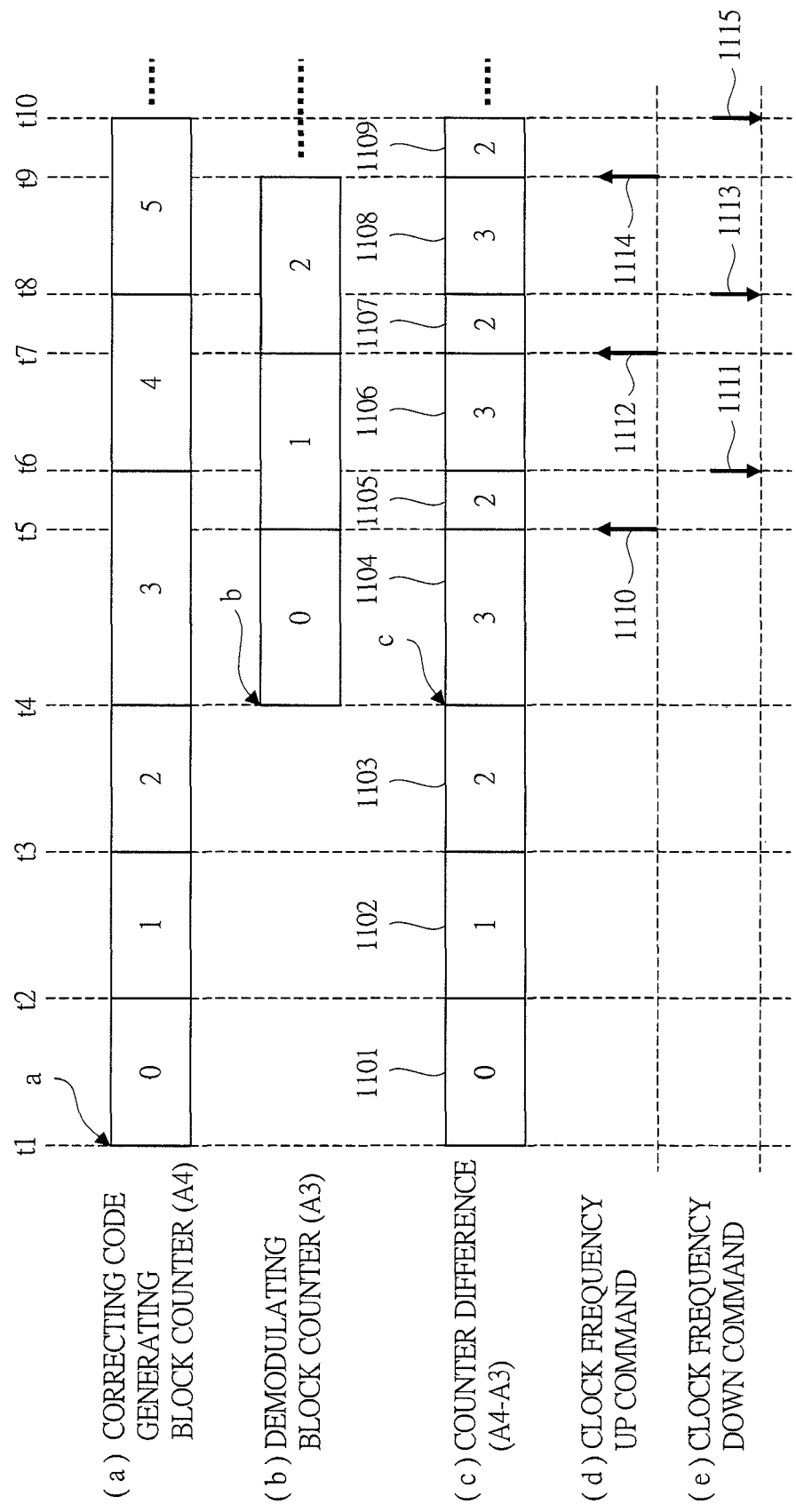
FIG. 11 is a timing chart showing an operation of the device according to the fourth embodiment.

Note that, the example of FIG. 11 is a case where an initial value of the frequency of the master clock (MCLK) is too low to handle an access from the modulating circuit 1003 and an access from the error-correcting-code generating circuit 1002 for one ECC block within the modulating process time for one ECC block.

In a period of 1102, while the error-correcting-code generating process in (a) for one ECC block is ended so that the value is A4=1, the modulation in (b) is not started yet so that the value is still A3=0, and therefore, the difference therebetween becomes 1. In a period of 1103, while another error-correcting-code generating process in (a) for one ECC block is ended so that the value is A4=2, the modulation in (b) is not started yet so that the value is still A3=0, and therefore, the difference therebetween becomes 2.

The modulating process is started at an end of the error-correcting-code generating process (t4) having the value of 2 as A4 of the error-correcting-code generating block counter 1006. Also, the clock control is activated at the same time with the start of the modulating process (arrow "c": clock control enable) to output the clock frequency up command when the counter difference of (c) is smaller than 3 and to output the clock frequency down command when the counter difference of (c) is 3 or larger. Here is a case where the setting value (S) of the comparing circuit 1008 is 3.

During a period having the value of 3 in A4 of the error-correcting-code generating block counter 1006 (a period of t4 to t6) and until the end of the modulating process for a first ECC block (a period of t4 to t5, 1104), the value of 0 is maintained as A3 of the modulating block counter 1007. The period having the value of 3 as A4 of the error-correcting-code generating block counter 1006 (t4 to t6) is longer than the periods having the values of 0, 1, and 2. This is caused by putting a low priority on the memory access of the error-correcting-code generating circuit 1002 similar to the third embodiment when the access to the memory 1004 increases due to the start of the modulating process.

Therefore, during the period having the value of 3 as A4 of the error-correcting-code generating block counter 1006, the modulating circuit 1003 ends the process for one ECC block so that the value of A3 of the modulating block counter 1007 changes to 1 (t5). Therefore, a value in the period 1105 (t5 to t6) of the counter difference of (c) becomes 2 which is lower than 3 of the setting value (S), so that a clock frequency up command 1110 is generated (t5).

By the clock frequency up command 1110, the error-correcting-code generating process is accelerated to end the process for one ECC block, so that the value of A4 of the error-correcting-code generating block counter 1006 changes from 3 to 4 (t6). By changing from 3 to 4 in the value of A4 of the error-correcting-code generating block counter 1006, the counter difference of (c) becomes 3 (period of t6 to t7, 1106), so that a clock frequency down command 1111 is generated to lower the frequency of the master clock.

Similarly, in the following, when the value of A3 of the modulating block counter 1007 becomes 2 by ending the modulating process for one ECC block, the difference becomes 2 (period of t7 to t8, 1107), so that the frequency of the master clock is raised by a clock frequency up command 1112. Sequentially, when A4 changes from 4 to 5 (t8) by ending the error-correcting-code generating process for one ECC block, the difference becomes 3 (period of t8 to t9, 1108), so that the frequency of the master clock is lowered by a clock frequency down command 1113. Subsequently, when one count-up is added to A3 (t9), the difference becomes 2 (period of t9 to t10, 1109), so that the frequency of the master clock is raised by a clock frequency up command 1114. Similarly, the frequency of the master clock is lowered by a clock frequency down command 1115.

As described above, according to the fourth embodiment, the frequency of the clock (MCLK) supplied to each of circuit units such as the error-correcting-code generating circuit 1002 is raised when the error-correcting-code generating process is delayed, and the frequency of the clock (MCLK) supplied to each of circuit units such as the error-correcting-code generating circuit 1002 is lowered when the error-correcting-code generating process is recovered from the delay. Therefore, a time required for the error-correcting-code generating process for one ECC block goes close to substantially the same with a time required for the modulating process for one ECC block. That is, an average frequency of clocks during one ECC block is controlled so as to be optimum. Therefore, a device for recording digital signals with extremely good power efficiency can be realized.

Note that the setting value (S) compared by the difference comparing circuit 1008 is made to be 3 in this example. However, a smaller value can be used for the setting value or the start of the modulating process can be delayed until the point of the arrow "b" if a capacity of the memory 1004 is sufficient, so that the clock (MCLK) tends to be controlled to be lower, thereby making the effect further effective. This is because, in a case of configuring the error-correcting-code generating process so as to depend on the access volume of the memory as described about the reproducing device in the third embodiment, the difference between the error correcting code generating block counter and the modulating block counter is compared to be determined in a state where the process time is integrated with a period having less accesses even if, for example, the error-correcting-code generating process time becomes temporary long due to the access of the input interface temporary increased by an external factor, so that the process time is averaged.

Note that the difference is compared to the setting value (S) with providing the modulating block counter 1007 and the error-correcting-code generating block counter 1006 in the fourth embodiment. However, such a configuration may be used that the setting value (S) is compared to a difference between an address used for reading an error-correcting-code generated data from the memory 1004 to the modulating circuit 1003 and an address used for reading and writing by the error-correcting-code generating circuit 1002 from/to the memory 1004. Also in this case, if the configuration has an address comparison in each of ECC blocks, a small-scale circuit can be realized.

Fifth Embodiment

Next, a device for recording digital signals (device for recording an optical disk) according to a fifth embodiment of the present invention will be described with reference to FIG. 12. A different point of the fifth embodiment from the fourth embodiment is to select and control two types of master clocks.

Figure 12:
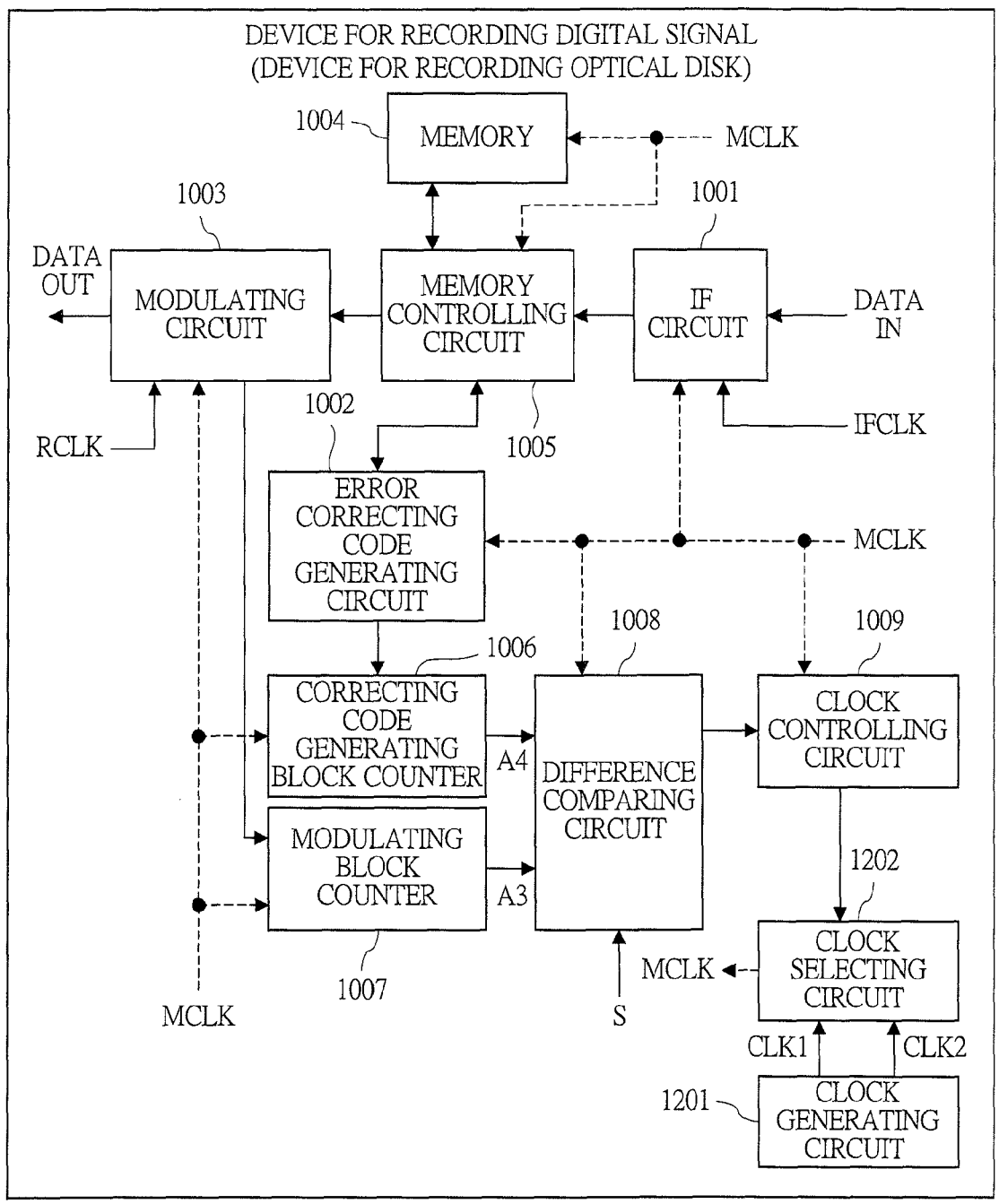
FIG. 12 is a diagram showing a configuration of a device for recording digital signals according to a fifth embodiment of the present invention.

FIG. 12 shows a block configuration of a process unit for recording digital signals in the present device for recording an optical disk. A different point of FIG. 12 from FIG. 10 is to provide a clock generating circuit 1201 and a clock selecting circuit 1202 instead of the variable clock generating circuit 1010. The clock generating circuit 1201 generates two types of a clock with a high frequency (first clock: CLK1) and a clock with a low frequency (second clock: CLK2). The clock selecting circuit 1202 selects either one of the two types of clocks (CLK1 or CLK2) of the clock generating circuit 1201 as following the clock frequency up command and the clock frequency down command from the clock controlling circuit 1009 to output the one as the master clock (MCLK) to each of units. The manner in the fourth embodiment is described about a relative up and down of the clock frequency and is not specified in two types of clocks.

According to the fifth embodiment, the optimum control for the master clock can be realized by a simple frequency-divider (clock generating circuit 1201) and a simple selecting circuit (clock selecting circuit 1202) to be preferable for the power saving similarly to the second embodiment of the case for the reproducing device.

Also, since a selecting ratio of the high clock (CLK1) and the low clock (CLK2) changes so as to adjust to a linear velocity also for the CAV (Constant Angular Velocity) recording, the power saving can be optimally realized.

In the foregoing, the invention made by the inventors of the present invention has been concretely described based on the embodiments. However, it is needless to say that the present invention is not limited to the foregoing embodiments and various modifications and alterations can be made within the scope of the present invention.

The present invention can be used for a device for recording and reproducing digital signals.

What is claimed is:

1. A device for reproducing digital signals reproducing a data from a medium recording a modulated data having a correcting block configured by attaching an error correcting code to a user data, the device comprising:
    a demodulating circuit for performing a demodulating process to a data read from the medium;
    a memory for storing a data demodulated in the demodulating circuit;
    a correcting circuit for performing an error correcting process to a data read from the memory;
    an output circuit for outputting an error-corrected data from the memory to an external point;
    a memory controlling circuit for controlling a read and a write of a data transferred between the memory and the demodulating circuit, the correcting circuit, and the output circuit;
    a comparing circuit for comparing a first parameter updated each time a process for one correcting block is done in the demodulating circuit with a second parameter updated each time a process for one correcting block is done in the correcting circuit; and
    a clock controlling circuit for switching a frequency of a clock supplied to the demodulating circuit, the correcting circuit, the output circuit, and the memory controlling circuit depending on a comparison result in the comparing circuit.

2. The device for reproducing digital signals according to claim 1, wherein
    the clock controlling circuit raises the frequency of the clock when the comparison result in the comparing circuit shows that a difference between the first parameter and the second parameter is larger than a set value.

3. The device for reproducing digital signals according to claim 1, wherein
    the clock controlling circuit selects either of two types of a first clock with a high frequency and a second clock with a low frequency and selects the first clock when the comparison result in the comparing circuit shows that a difference between the first parameter and the second parameter is larger than a set value.

4. The device for reproducing digital signals according to claim 1, wherein
    a correcting process time for one correcting block changes depending on a reading time of a data from the memory or a writing time of a corrected data to the memory in the correcting circuit.

5. The device for reproducing digital signals according to claim 4, wherein
    the memory controlling circuit puts a priority on a data transfer between the demodulating circuit and the memory and a data transfer between the output circuit and the memory rather than a data transfer between the correcting circuit and the memory.

6. The device for reproducing digital signals according to claim 4, wherein
    the writing time of the corrected data in the correcting circuit to the memory changes depending on a volume of data errors contained in a reproducing data.

7. The device for reproducing digital signals according to claim 1, wherein
    a correcting process time for one correcting block in the correcting circuit changes depending on a size of a volume of the demodulated data in the demodulating circuit per constant time and a size of a volume of the outputted data in the output circuit per constant time.

8. A device for reproducing digital signals reproducing a data from a medium recording a modulated data having a correcting block configured by attaching an error correcting code to a user data, the device comprising:
    a demodulating circuit for performing a demodulating process to a data read from the medium;
    a memory for storing a data demodulated in the demodulating circuit;
    a correcting circuit for performing an error correcting process to a data read from the memory;
    an output circuit for outputting an error-corrected data from the memory to an external point;
    a memory controlling circuit for controlling a read and a write of a data transferred between the memory and the demodulating circuit, the correcting circuit, and the output circuit;
    a comparing circuit for comparing a first parameter updated depending on a volume of the data demodulated in the demodulating circuit with a second parameter updated depending on a volume of the data error-corrected in the correcting circuit; and a clock controlling circuit for switching a frequency of a clock supplied to the demodulating circuit, the correcting circuit, the output circuit, and the memory controlling circuit depending on a comparison result in the comparing circuit.

9. A method of reproducing digital signals reproducing a data in a device for reproducing digital signals, the device comprising:

a demodulating circuit for performing a demodulating process to a data read from a medium recording a modulated data having a correcting block configured by attaching an error correcting code to a user data;

a memory for storing a data demodulated in the demodulating circuit; a correcting circuit for performing an error correcting process to a data read from the memory;

an output circuit for outputting an error corrected data from the memory to an external point; and a memory controlling circuit for controlling a read and a write of a data transferred between the memory and the demodulating circuit, the correcting circuit, and the output circuit, the method comprising:

a processing sequence for updating a first parameter each time a process for one correcting block is done in the demodulating circuit;

a processing sequence for updating a second parameter each time a process for one correcting block is done in the correcting circuit;

a processing sequence for calculating a difference between the first parameter and the second parameter; and a processing sequence for performing a control to switch a frequency of a clock supplied to the demodulating circuit, the correcting circuit, the output circuit, and the memory controlling circuit depending on the difference.

10. The method for reproducing digital signals according to claim 9, wherein the frequency of the clock is raised when the difference is larger than a set value and the frequency of the clock is lowered when the difference is smaller than the set value in the processing sequence for performing the control to switch the frequency of the clock.

11. A device for recording digital signals modulating a data having a correcting block configured by attaching an error correcting code to an inputted user data, and recording the data to a medium, the device comprising:

an input circuit for inputting the user data from an external point;

a memory for storing a data inputted from the input circuit;

an error-correcting-code generating circuit for generating an error correcting code for a data read from the memory;

a modulating circuit for reading a data having a correcting block configured by attaching the error correcting code from the memory to perform a modulating process;

a memory controlling circuit for controlling a read and a write of a data transferred between the memory and the input circuit, the error-correcting-code generating circuit, and the modulating circuit;

a comparing circuit for comparing a third parameter updated each time a process for one correcting block is done in the modulating circuit and a fourth parameter updated each time a process for one correcting block is done in the error-correcting-code generating circuit; and a clock controlling circuit for controlling to switch a frequency of a clock supplied to the input circuit, the error-correcting-code generating circuit, the modulating circuit, and the memory controlling circuit depending on a comparison result in the comparing circuit.

12. The device for recording digital signals according to claim 11, wherein the clock controlling circuit raises the frequency of the clock when the comparison result in the comparing circuit shows that a difference between the third parameter and fourth parameter is smaller than a set value.

13. The device for recording digital signals according to claim 11, wherein the clock controlling circuit selects either of two types of a first clock with a high frequency and a second clock with a low frequency and selects the first clock when the comparison result in the comparing circuit shows that a difference between the third parameter and the fourth parameter is smaller than a set value.

14. The device for recording digital signals according to claim 11, wherein an error-correcting-code generating process time for one correcting block in the error-correcting-code generating circuit changes depending on a size of a volume of the modulated data in the modulating circuit per constant time and a size of a volume of the outputted data from the input circuit per constant time.

15. A method of recording digital signals recording a data in a device for recording digital signals, the device comprising:

an input circuit for inputting a user data from an external point;

a memory for storing a data inputted from the input circuit;

an error-correcting-code generating circuit for generating an error correcting code for a data read from the memory;

a modulating circuit for reading a data, to which the error correcting code is attached, from the memory to perform a modulating process; and a memory controlling circuit for controlling a read and a write of a data transferred between the memory and the input circuit, the error-correcting-code generating circuit, and the modulating circuit, the method comprising:

a processing sequence for updating a fourth parameter each time a process for one correcting block is done in the error-correcting-code generating circuit;

a processing sequence for updating a third parameter each time a process for one correcting block is done in the modulating circuit;

a processing sequence for calculating a difference between the fourth parameter and the third parameter; and a processing sequence for performing a control to switch a frequency of a clock supplied to the input circuit, the error-correcting-code generating circuit, the modulating circuit, and the memory controlling circuit depending on the difference.

16. The method for recording digital signals according to claim 15, wherein the frequency of the clock is lowered when the difference is larger than a set value and the frequency of the clock is raised when the difference is smaller than the set value in the control to switch the frequency of the clock.

* * * * *